(12) United States Patent
Bashiry-Khoshraftar et al.

(10) Patent No.: US 10,688,973 B2
(45) Date of Patent: Jun. 23, 2020

(54) PARKING BRAKE EMULATOR

(71) Applicant: FLEX-N-GATE ADVANCED PRODUCT DEVELOPMENT LLC, Warren, MI (US)

(72) Inventors: Jaafar Bashiry-Khoshraftar, Richmond Hill (CA); Simon Kwan Hoi Chan, Markham (CA); Hai Yang Zou, Bradford (CA); Rajesh Marwaha, Newmarket (CA); Joaquin Hung, Markham (CA); Ramesh Periasamy, Bradford (CA)

(73) Assignee: FLEX-N-GATE ADVANCED PRODUCT DEVELOPMENT LLC, Warren, MI (US)

( * ) Notice: Subject to any disclaimer, the term of this patent is extended or adjusted under 35 U.S.C. 154(b) by 311 days.

(21) Appl. No.: 15/966,596

(22) Filed: Apr. 30, 2018

(65) Prior Publication Data

US 2019/0329743 A1    Oct. 31, 2019

(51) Int. Cl.
| | |
|---|---|
| *B60T 7/08* | (2006.01) |
| *B60T 8/40* | (2006.01) |
| *B60T 7/10* | (2006.01) |
| *G05G 1/04* | (2006.01) |
| *G05G 5/03* | (2008.04) |

(52) U.S. Cl.
CPC ............... *B60T 7/085* (2013.01); *G05G 1/04* (2013.01); *G05G 5/03* (2013.01); *B60T 2270/402* (2013.01); *B60T 2270/82* (2013.01)

(58) Field of Classification Search
CPC .......... B60T 7/085; B60T 7/08; B60T 8/4086; B60T 8/4081; B60T 7/104; B60T 2270/402; B60T 2270/82; B60T 7/107; G05G 1/04; G05G 5/03
See application file for complete search history.

(56) References Cited

U.S. PATENT DOCUMENTS

| | | | |
|---|---|---|---|
| 5,205,184 A * | 4/1993 | Noel ..................... | B60T 7/10 74/535 |
| 6,079,794 A | 6/2000 | Drott | |

(Continued)

FOREIGN PATENT DOCUMENTS

| | | |
|---|---|---|
| DE | 4228381 | 3/1993 |
| DE | 4205588 | 8/1993 |

(Continued)

*Primary Examiner* — Tinh Dang
(74) *Attorney, Agent, or Firm* — Foley & Lardner LLP

(57) ABSTRACT

A parking brake emulator assembly for a vehicle is provided. The emulator assembly includes a mounting bracket. The mounting bracket includes a front spring mounting flange with a spring mounting hole. The emulator assembly further includes a brake lever, a spring guiding rod, a spring, and a rear spring holder. The brake lever is rotatable relative to the mounting bracket into a neutral position and a brake application position. The spring guiding rod is coupled to the brake lever via a pinned connection, and extends through the spring and the rear spring holder. Rotation of the brake lever from the neutral position to the brake application position moves the pinned connection to thereby move the spring guiding rod and the rear spring holder towards the front spring mounting flange, thereby compressing the spring.

20 Claims, 14 Drawing Sheets

(56) References Cited

U.S. PATENT DOCUMENTS

| | | | |
|---|---|---|---|
| 6,139,117 | A | 10/2000 | Shirai et al. |
| 6,249,737 | B1 | 6/2001 | Zipp |
| 6,250,649 | B1 | 6/2001 | Braun |
| 6,648,107 | B2 | 11/2003 | Lundholm et al. |
| 7,841,672 | B2 | 11/2010 | Teifke et al. |
| 9,604,720 | B2 | 3/2017 | Cahill |
| 2011/0030497 | A1* | 2/2011 | Djordjevic ............ B60T 11/046 74/501.5 R |
| 2018/0056950 | A1* | 3/2018 | Steakley ............... B60T 13/746 |

FOREIGN PATENT DOCUMENTS

| | | |
|---|---|---|
| EP | 0978432 | 2/2000 |
| EP | 2674335 | 12/2013 |
| EP | 2886405 | 6/2015 |
| WO | WO2008/049798 | 5/2008 |
| WO | WO2011/039556 | 4/2011 |
| WO | WO2016/150697 | 9/2016 |

* cited by examiner

PARKING BRAKE EMULATOR

BACKGROUND

The present disclosure relates generally to the field of vehicle parking brakes. More specifically, the present disclosure relates to a parking brake emulator configured to supplement an electronic parking brake module.

SUMMARY

At least one embodiment of the application relates to a parking brake emulator assembly for a vehicle. The emulator assembly includes a mounting bracket. The mounting bracket includes a front spring mounting flange with a spring mounting hole. The emulator assembly further includes a brake lever, a spring guiding rod, a spring, and a rear spring holder. The brake lever is rotatable relative to the mounting bracket into a neutral position and a brake application position. The spring guiding rod is coupled to the brake lever via a pinned connection, and extends through the spring and the rear spring holder. Rotation of the brake lever from the neutral position to the brake application position moves the pinned connection to thereby move the spring guiding rod and the rear spring holder towards the front spring mounting flange, thereby compressing the spring.

At least one embodiment relates to a parking brake emulator assembly that includes a mounting bracket and a brake lever configured to be rotated relative to the mounting bracket into a neutral position and a brake application position. The brake lever includes a first end configured to receive an applied force for the purpose of rotating the brake lever between the neutral position and the brake application position and a second end with a roller component. The parking brake emulator assembly also includes a cam member with a first end pivotally coupled to the mounting bracket, a second end including a lever arm, and a cam surface located between the first and second ends that is configured to contact the roller component. The parking brake emulator assembly further includes a spring having a first end that is coupled to the mounting bracket, and a second end that is coupled to the lever arm. Rotation of the brake lever from the neutral position to the brake application position in turn pivots the cam member as the roller component moves along the cam surface to compress the spring with the lever arm.

At least one embodiment relates to a parking brake emulator assembly for a vehicle that includes a mounting bracket and a brake lever rotatably coupled to the mounting bracket at a pivot. The brake lever includes a lever arm and an integrated cam surface on opposite sides of the pivot, and is rotatable through the lever arm into a neutral position and a brake application position. The parking brake emulator assembly further includes a spring with a first end and a second end. The first end is coupled to the mounting bracket and the second end is coupled to a spring retainer. The emulator assembly additionally includes a roller operatively coupled to the spring retainer and in contact with the integrated cam surface of the brake lever. The roller moves along the cam surface in response to rotation of the brake lever from the neutral position to the brake application position, which in turn moves the roller and the spring retainer to compress the spring.

DETAILED DESCRIPTION

A fully mechanical lever and cable system can bypass the normal vehicle brake system and bring the vehicle to a complete stop if there is a failure in the normal vehicle brake system. When a driver sets the parking brake by applying an upward force on a parking brake lever, a brake cable attached at one end to the parking brake lever is tightened. The other end of the brake cable is attached to a U- or Y-shaped equalizer that divides the tension force and sends it evenly across two cables connected to the rear wheels of the vehicle. If the vehicle includes drum-style brakes, the two cables are directly connected to brake shoes, which are pulled by the cables to create stopping friction. If the vehicle includes disc-style brakes, the two cables may operate a lever to turn a screw or actuate a cam to operate a piston, which squeezes brake pads used to create stopping friction.

By contrast, fully electronic parking brake modules utilize sensors that detect driver application of a parking brake and transmit electronic control signals to engage the parking brake in response. However, fully electronic parking brake modules lack the look and feel of fully mechanical parking brakes, which are often desired. Therefore, a solution that integrates with an electronic parking brake module and mimics the operation and feel of a mechanical parking brake system would be useful and desirable.

Referring generally to the FIGURES, disclosed herein are various embodiments of parking brake emulator assemblies. A parking brake emulator assembly is designed to supplement an electronic parking brake module of a vehicle by providing the driver with the feel and control of a traditional mechanical parking brake, while utilizing angular sensors to detect that a driver has activated the parking brake by rotating a brake lever. In one or more embodiments, the angular sensor can detect the angular rotation/position of the brake lever and adjust the brake force applied by the parking brake based on the angular rotation/position of the brake lever. The angular sensor input is processed by a vehicle computer (e.g., electronic control module, electronic control unit, electronic parking brake module, etc.) and is sent to the electronic parking brake module as a control signal.

Figure 1:
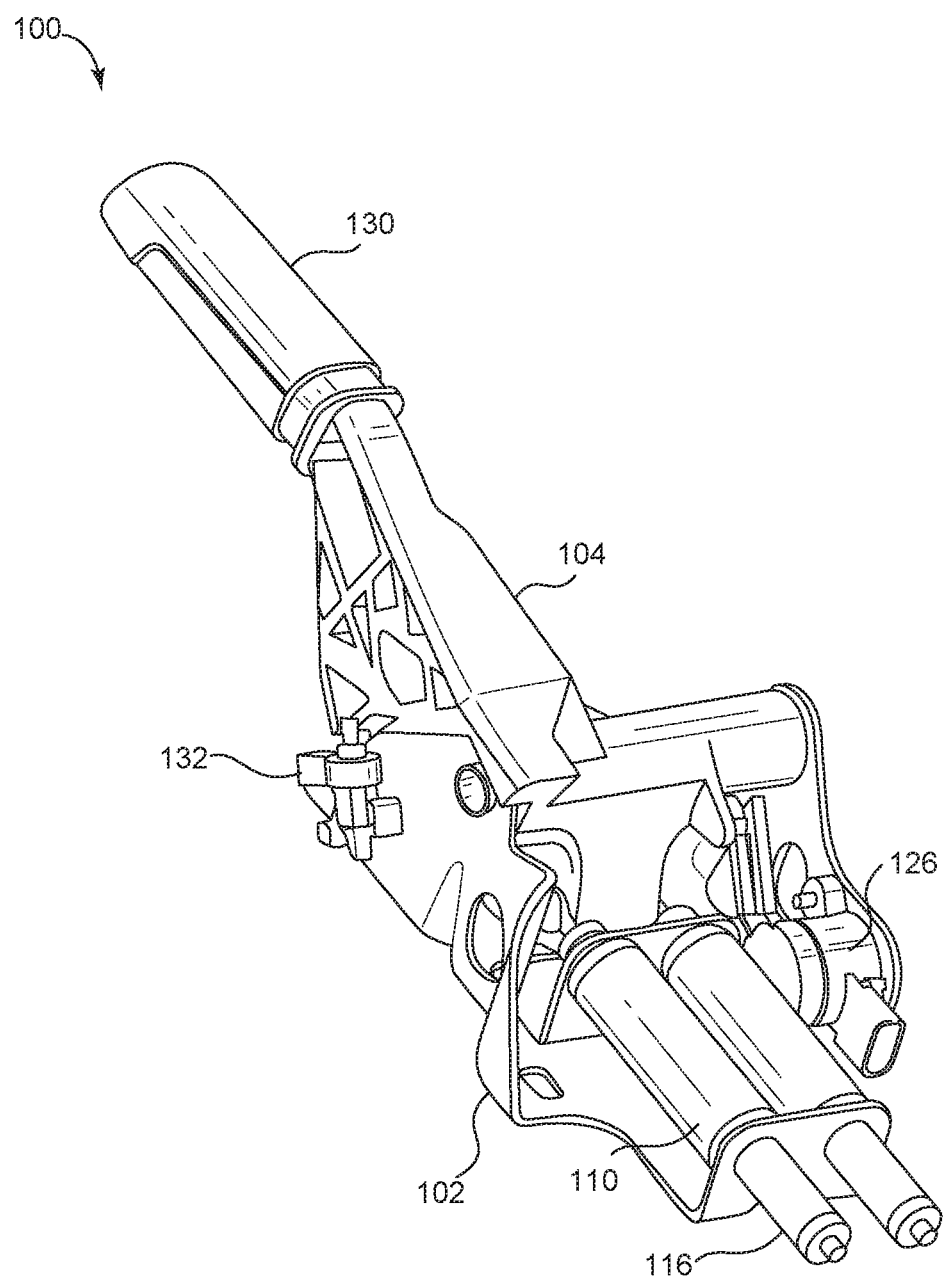
FIG. 1 is a perspective view of a parking brake emulator assembly, according to an exemplary embodiment of this application.
Figure 2:
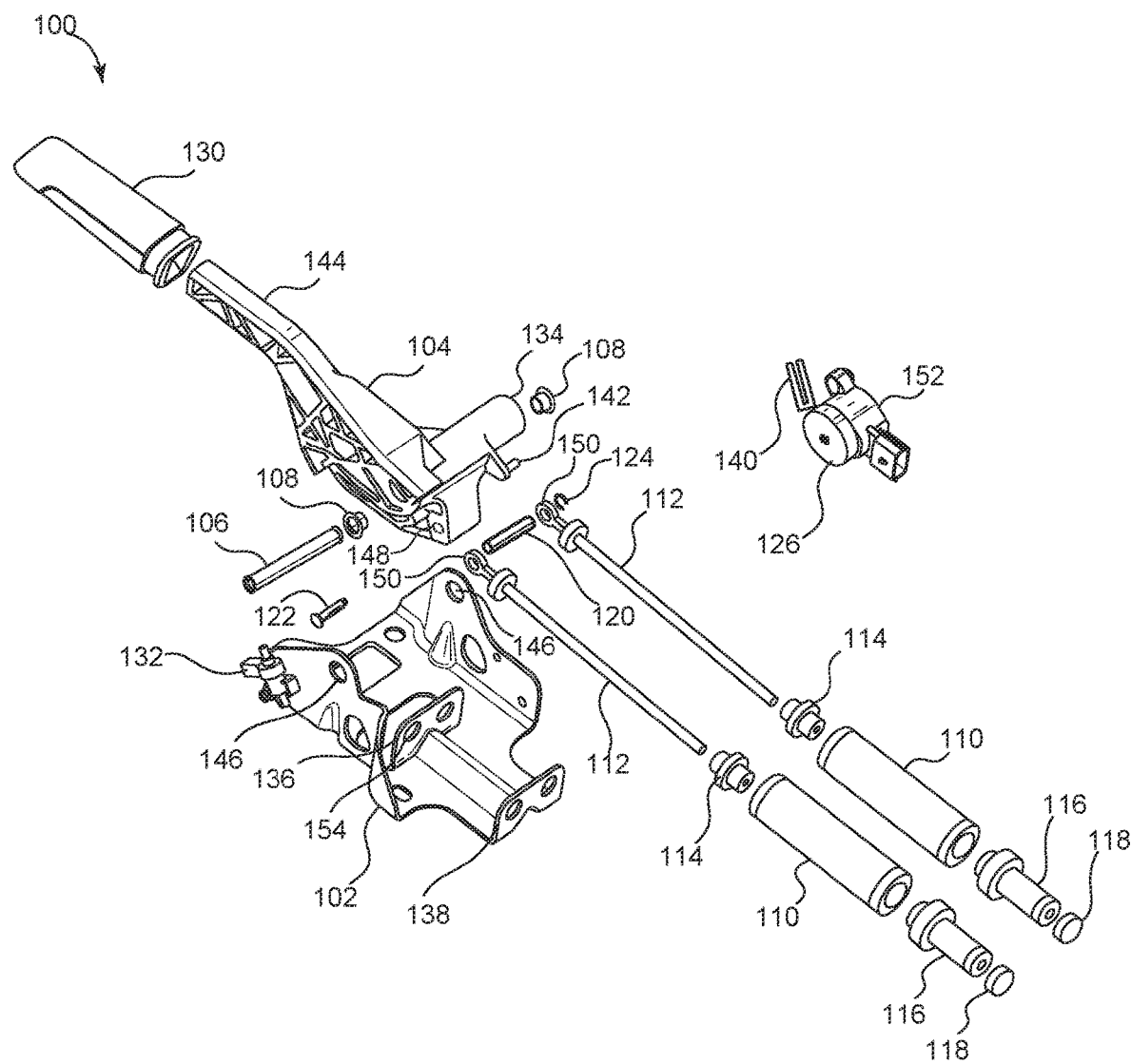
FIG. 2 is an exploded perspective view of the parking brake emulator assembly shown in FIG. 1.
Figure 3:
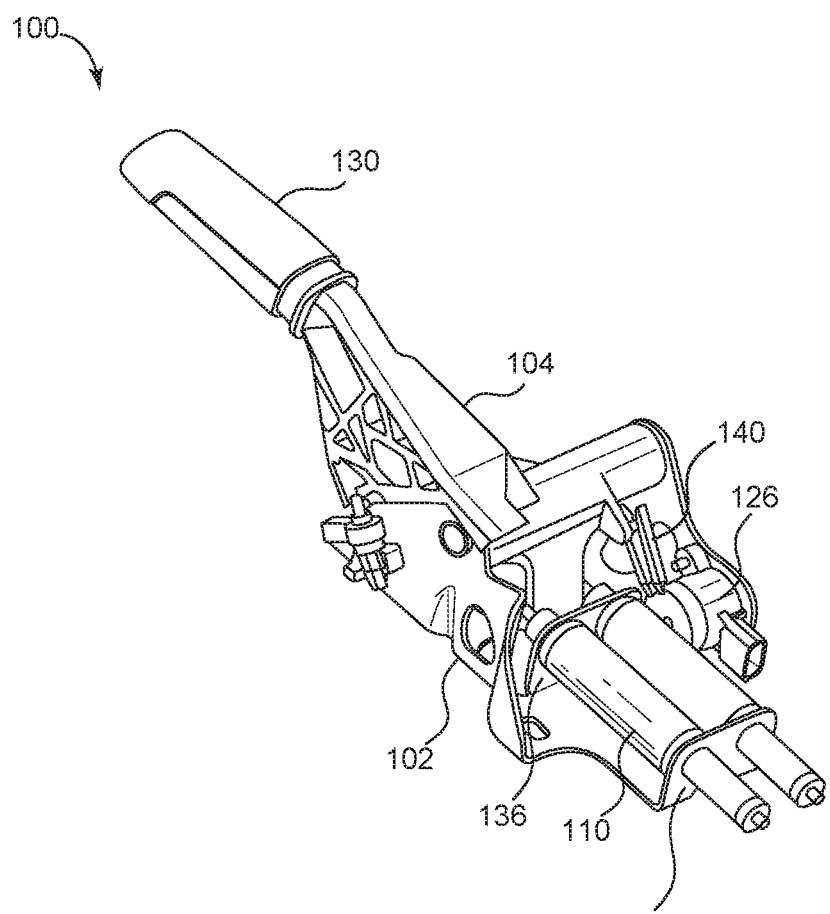
FIG. 3 is another perspective view of the parking brake emulator assembly shown in FIG. 1 in a neutral position.
Figure 4:
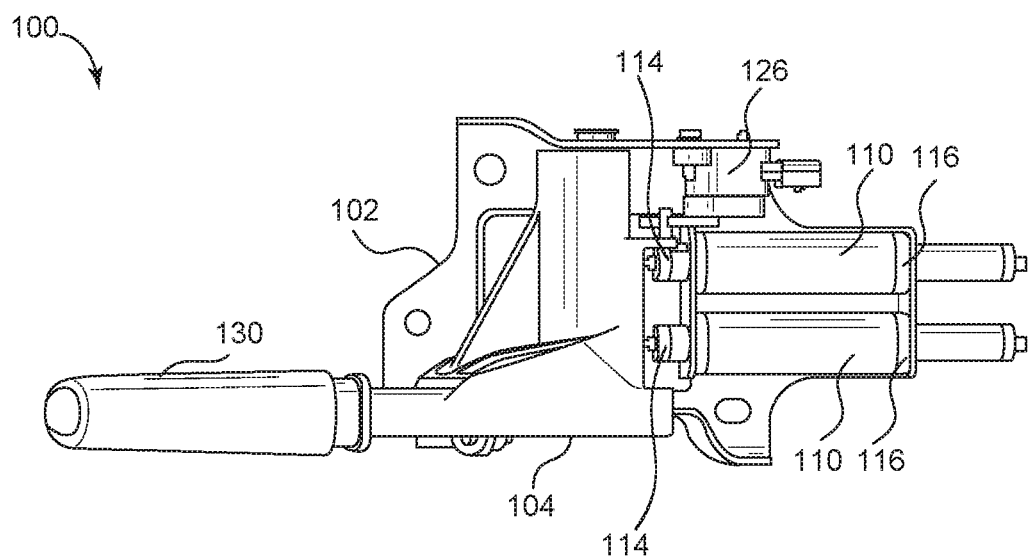
FIG. 4 is a top elevation view of the parking brake emulator assembly shown in FIG. 1 in the neutral position.

Referring now to FIGS. 1-6, various views of a parking brake emulator assembly 100 are shown, according to an exemplary embodiment. FIG. 1 depicts a perspective view of the emulator assembly 100 in an assembled state, while FIG. 2 depicts an exploded perspective view of the emulator assembly 100. FIGS. 3 and 4 respectively depict perspective and top views of the emulator assembly 100 in a neutral position (e.g., a non-locking position, a non-braking position, etc.), while FIGS. 5 and 6 respectively depict perspective and top views of the emulator assembly 100 in a brake application position.

As shown, the parking brake emulator assembly 100 includes a mounting bracket 102 and a brake lever 104. In various embodiments, the mounting bracket 102 may be configured to couple the emulator assembly 100 to an appropriate location in the vehicle structure (e.g., between a driver seat and a passenger seat) through any suitable means (e.g., mechanical fasteners). The brake lever 104 can be rotated relative to the mounting bracket 102 into a neutral position, a brake application position, and a brake disengage position by a driver of the vehicle. For example, a driver can rotate the brake lever 104 to the brake application position from the neutral position by grabbing and applying an upward force to the grip 130 of the brake lever 104. Once the driver releases the upward force on the grip 130, the brake lever 104 automatically travels back to the neutral position. Similarly, a driver can rotate the brake lever 104 to the brake disengage position from the neutral position by applying a downward force to the grip 130 of the brake lever 104. When the driver releases the downward force on the grip 130, the brake lever 104 automatically travels back to the neutral position. As shown in FIG. 2, the brake lever 104 is rotatably coupled to the mounting bracket 102 through a pivot tube 106. The pivot tube 106 is configured to permit the brake lever 104 to rotate through one or more pivot bushings 108 installed into a pivot hole 134 of the brake lever 104.

The parking brake emulator assembly 100 is further shown to include spring components configured to mimic the force provided by a brake cable when a mechanical parking brake is applied by a driver. The spring components include at least one compression spring 110, at least one guiding rod 112, at least one front spring holder 114, at least one rear spring holder 116, and at least one spring guiding rod endcap 118. As shown in FIG. 2, in one or more embodiments, the parking brake emulator assembly 100 includes two compression springs 110, two guiding rods 112, two front spring holders 114, two rear spring holders 116, and two spring guiding rod endcaps 118. The compression springs 110 may be chosen such that the characteristic spring rate (i.e., the amount of force required to effect a particular deflection in the spring, often expressed in pounds of force per inch (lbf/in) or Newtons per meter (N/m)) approximates the force that would be provided by a mechanical brake system. In some embodiments, the number of springs 110 can be selected to approximate the force provided by a mechanical brake system in the packaging space available to the parking brake emulator assembly 100. For example, although the parking brake emulator assembly 100 depicts the assembly with two compression springs 110, any number of compression springs 110, including a single compression spring 110, could be utilized in parking brake emulator assembly 100.

As shown in FIG. 2, the mounting bracket 102 includes a front spring mounting flange 136 and a rear spring mounting flange 138. Each of the front and rear spring mounting flanges 136, 138 includes one or more mounting holes configured to permit the compression springs 110 to be mounted between the front spring holders 114 and the rear spring holders 116. Each of the guiding rods 112 is shown to terminate at one end in an eye opening 150. The eye opening 150 can couple the guiding rods 112 to the brake lever 104 through a pinned connection secured by a pin 122 and a C-clip 124. The end of the guiding rods 112 opposite the eye opening can be inserted through the front spring holders 114, the compression springs 110, and the rear spring holders 116, and may be secured by spring guiding rod endcaps 118. Further details of the assembly procedure of the parking brake emulator assembly 100 are included below with reference to FIG. 2.

Still referring to FIGS. 1-6, an angular sensor assembly 126 is operatively coupled to the brake lever 104 to detect the rotational position of the brake lever 104 and to transmit a control signal to a vehicle electronic parking brake module in response to rotational movement of the brake lever 104. The angular sensor assembly 126 is shown in FIG. 2 to include a body portion 152, which is coupled to the mounting bracket 102, and a forked portion 140, which is rotatably coupled to the body portion and is configured to slidably couple to a feature (e.g., protrusion 142) of the brake lever 104 such that rotation of the brake lever 104 results in a corresponding rotation of the forked portion 140 relative to the body portion 152 of the angular sensor assembly 126. In an alternative embodiment, rather than a forked portion, the angular sensor assembly 126 includes a slotted bracket rotatably coupled to the body portion (depicted in FIG. 14, described in greater detail below). In one or more embodiments, the body portion 152 of the angular sensor assembly 126 is coupled to the interior of the mounting bracket 102 via any suitable mechanical fasteners (e.g., screws, pins). The angular sensor assembly 126 can include a potentiometer or other suitable device for measuring the angle of rotation of the forked portion 140 relative to the body portion.

In one or more embodiments, the parking brake emulator assembly 100 shown in FIG. 2 also includes a toggle switch assembly 132. In one or more embodiments, the toggle switch assembly 132 is configured to detect the position of the brake lever 104 and to transmit a signal to a vehicle instrument panel in response. For example, when the toggle switch assembly 132 detects that the brake lever 104 is in the brake application position, the toggle switch assembly 132 transmits a control signal that illuminates a parking brake indicator on the vehicle instrument panel. When the toggle switch assembly 132 detects that the brake lever 104 has been rotated downward to release the parking brake, the toggle switch assembly 132 transmits a control signal that turns off the parking brake indicator on the vehicle instrument panel.

Referring specifically to FIG. 2, an assembly process for the emulator assembly 100 may proceed as follows. First, the front spring holders 114 are inserted into the associated guide holes 154 of the front spring mounting flange 136 of the mounting bracket 102, and the rear spring holders 116 are inserted into the associated guide holes 156 of the rear spring mounting flange 138 of the mounting bracket 102. The springs 110 are compressed and installed between the front spring holders 114 and the rear spring holders 116. Next, the grip 130 is inserted on the lever arm end 144 of the brake lever 104, and one pivot bushing 108 is inserted into each one of two sides of the pivot hole 134 of the brake lever 104. Similarly, a pin bushing 120 is inserted into a slot 148 of the brake lever 104.

Next, the eye opening end of each guiding rod 112 is aligned with the pin bushing 120 installed in cam slot 148, and a pin 122 is inserted through a first guiding rod 112, the pin bushing 120, and a second guiding rod 112. The pin 122 is then secured in position with the C-clip 124. Each of the spring guiding rods 112 is then inserted through a front spring holder 114, a compression spring 110, and a rear spring holder 116 before being secured by a spring guiding rod endcap 118. Following the installation of the spring components, the pivot bushings 108 installed in the pivot hole 134 are aligned with the pivot holes 146 of the mounting bracket 102, and pivot tube 106 is inserted through a first pivot hole 146 (e.g., a pivot hole in a first flange of the mounting bracket 102), a first pivot bushing 108, a second pivot bushing 108, and a second pivot hole 146 (e.g., a pivot hole in a second flange of the mounting bracket 102 that is offset from the first flange and generally orthogonal to the spring mounting flanges 136, 138). Once installed, the pivot tube 106 can be secured (e.g., staked, swaged, etc.) at each end to create an interference fit between the pivot tube 106 and the pivot holes 146 of the mounting bracket 102.

Then, the angular sensor assembly 126 and the toggle switch assembly 132 are installed on the mounting bracket 102, such as on the first and second flanges thereof. Before securing the angular sensor assembly 126 to the mounting bracket 102 using any suitable mechanical element or fastener (e.g., bolts, screws, pins, rivets, etc.), the forked portion 140 of the angular sensor assembly 126 is aligned with the protrusion 142 on the brake lever 104 so that the forked portion 140 rotates with the brake lever 104. The toggle switch assembly 132 can be similarly secured to the mounting bracket 102 via any suitable mechanical element or fastener.

Figure 5:
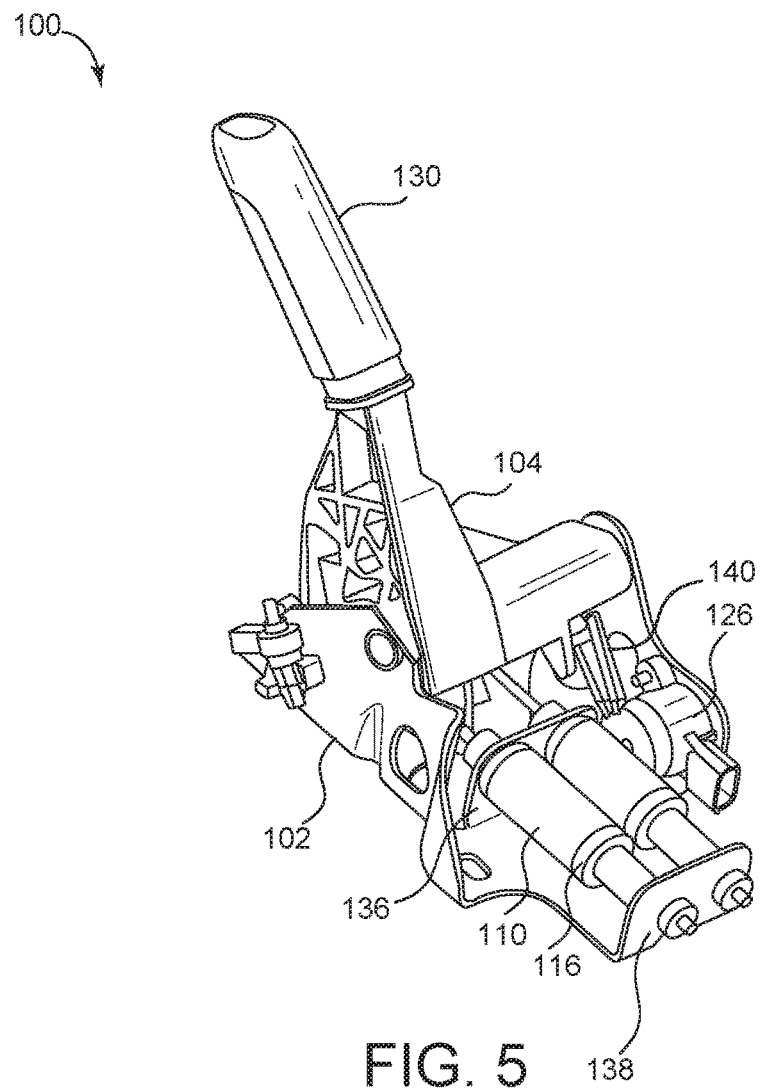
FIG. 5 is another perspective view of the parking brake emulator assembly shown in FIG. 1 in a full brake application position.
Figure 6:
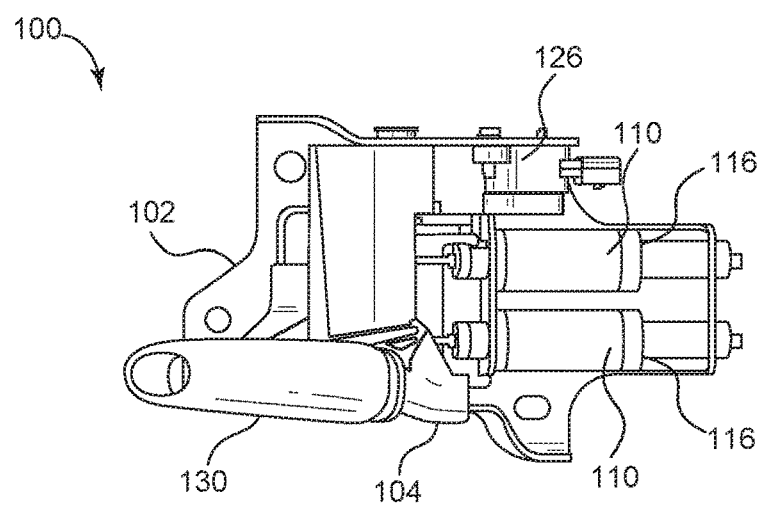
FIG. 6 is a top elevation view of the parking brake emulator assembly shown in FIG. 1 in the full brake application position.

When the parking brake emulator assembly 100 is in the neutral position, as depicted in FIGS. 3 and 4, a head of each rear spring holder 116 is flush against the rear spring mounting bracket 138, and the springs 110 are in a partially compressed state. Partial compression of the springs 110 in the neutral position (e.g., 2-3 mm of compression) can prevent excessive noise, such as due to rattling of the springs 110 or other elements during vehicle operation under normal conditions. As depicted in FIGS. 5 and 6, when a vehicle operator applies an upward force on the grip 130 to rotate the brake lever 104 from the neutral position to the brake application position, the brake lever 104 pulls the spring guiding rods 112 and the rear spring holders 116 forward toward the front spring mounting bracket 136. This translation of the rear spring holders 116 compresses the springs 110 against the front spring mounting bracket 136 to provide the force that emulates the force provided by the brake cable in a manual parking brake system. As the brake lever 104 is rotated from the neutral position toward the brake application position, the forked portion 140 of the angular sensor assembly 126 is rotated along with the brake lever 104, which causes the angular sensor assembly 126 to transmit a signal to the electronic parking brake module to engage the parking brake mechanism. In one or more embodiments, the angular sensor assembly 126 can detect and measure angular rotation of the forked portion 140 relative to the body portion 152 and transmit a signal to the electronic parking brake module to apply to a variable parking brake force based on the angular rotation of the slotted portion 126. Toggle switch assembly 132, if provided with the parking brake emulator assembly 100, detects the change in brake lever 104 position and sends a control signal to the vehicle computer to illuminate a parking brake indicator on the vehicle instrument panel.

Once the driver releases the upward force on the grip 130, the brake lever 104 automatically travels from the brake application position to the neutral position as the compression of the springs 110 relaxes and the rear spring holders 116 return to rest flush against the rear spring mounting bracket 138. When a vehicle operator applies a downward force on the grip 130 to rotate the brake lever 104 to a brake disengage position (e.g., approximately 5° from the neutral position), the spring guiding rods 112 and the front spring holders 114 travel rearward, causing the springs 110 to compress in the opposite direction as the brake application position. The rear spring holders 116 are held stationary by the rear spring mounting bracket 138 to serve as a reaction face for the springs 110. At the same time, rotation of the forked portion 140 causes angular sensor assembly 126 to transmit a signal to the electronic parking brake module to disengage the parking brake mechanism, while the toggle switch assembly 132, if provided, sends a control signal to the vehicle computer to turn off the parking brake indicator on the vehicle instrument panel. After the driver releases the downward force on the grip 130, relaxation of the springs 110 causes the brake lever 104 to automatically return to the neutral position.

Figure 7:
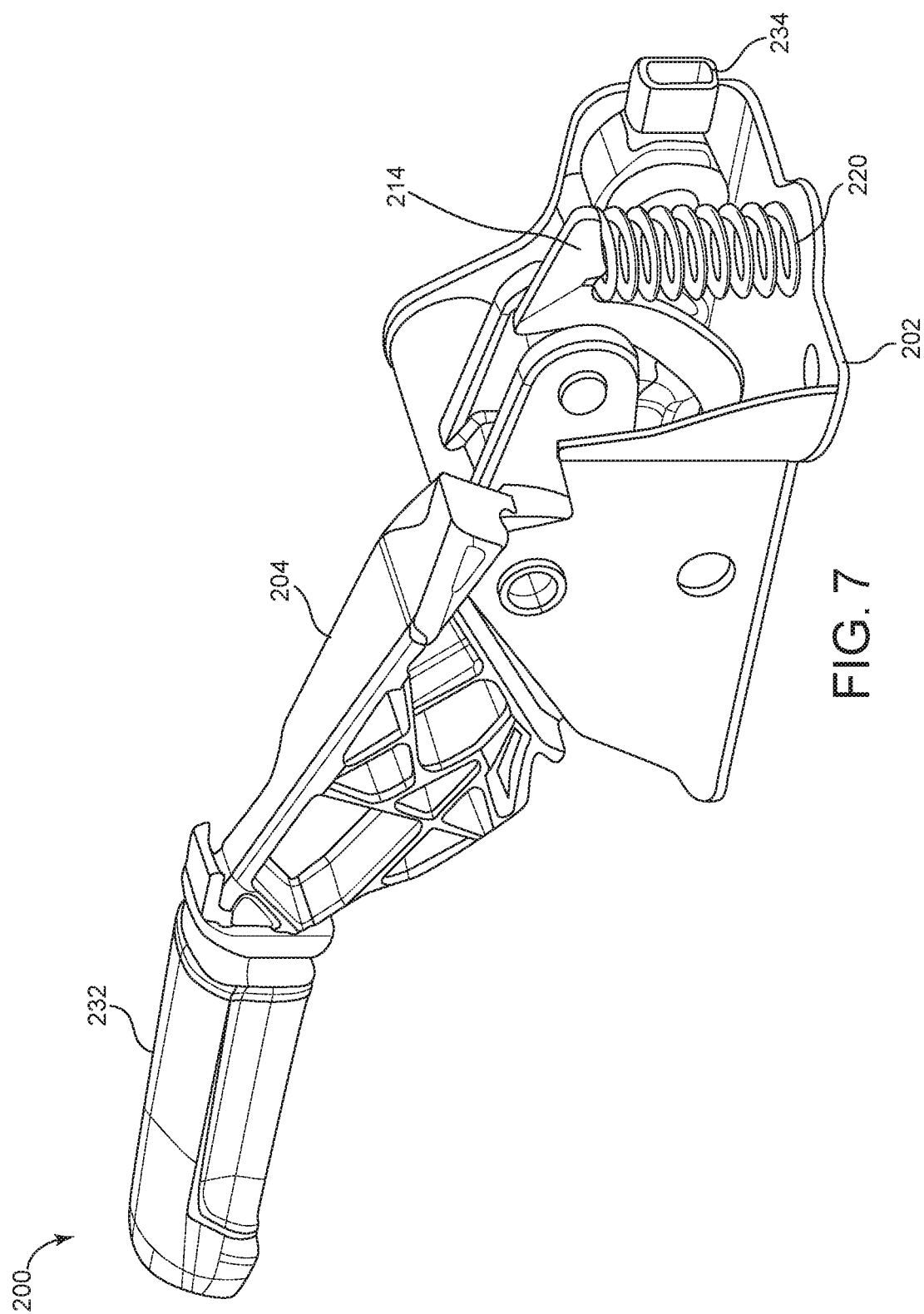
FIG. 7 is a perspective view of an exemplary embodiment of a cam and roller parking brake emulator assembly, according to this application.
Figure 8:
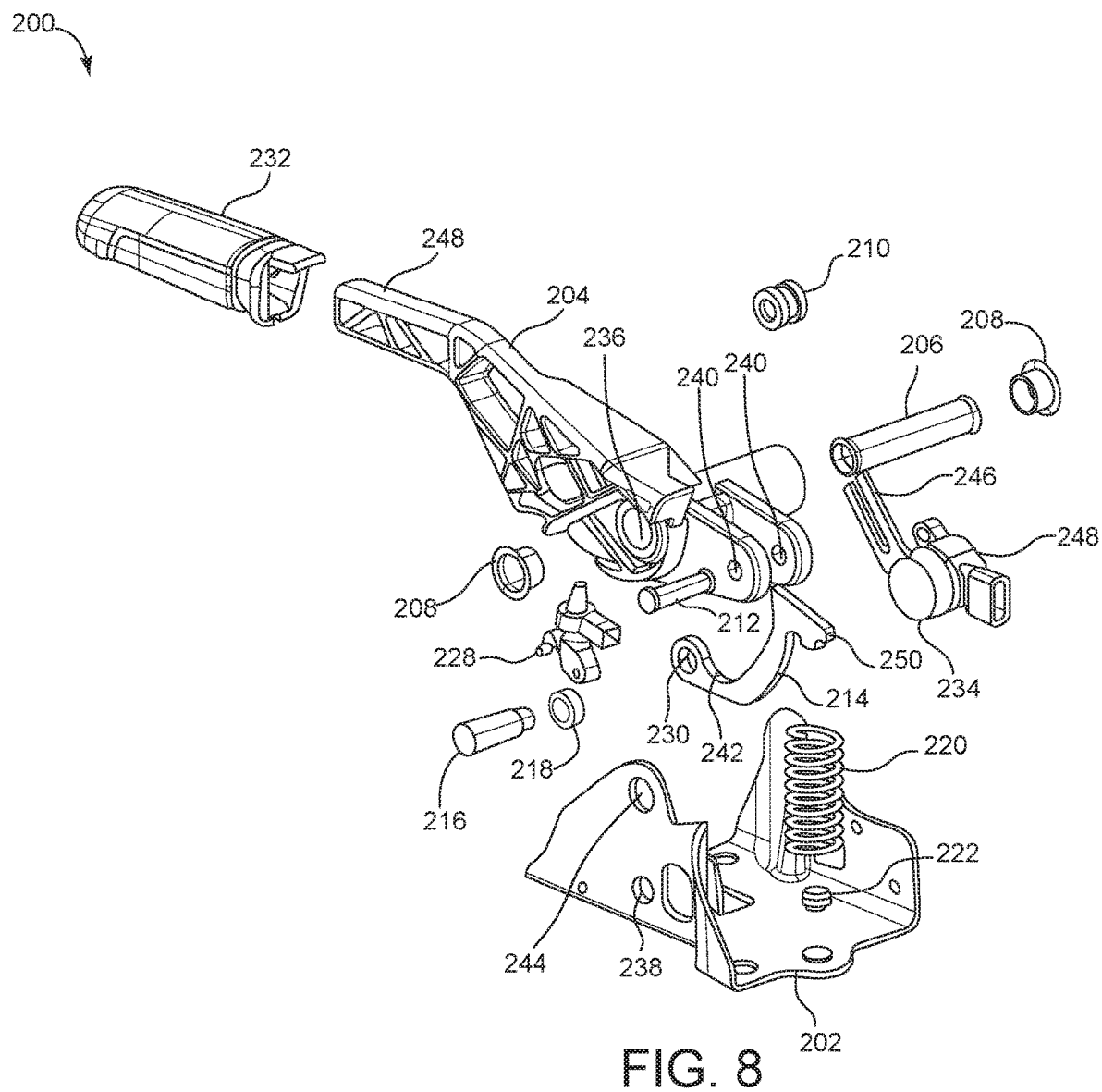
FIG. 8 is an exploded perspective view of the parking brake emulator assembly shown in FIG. 7.
Figure 9:
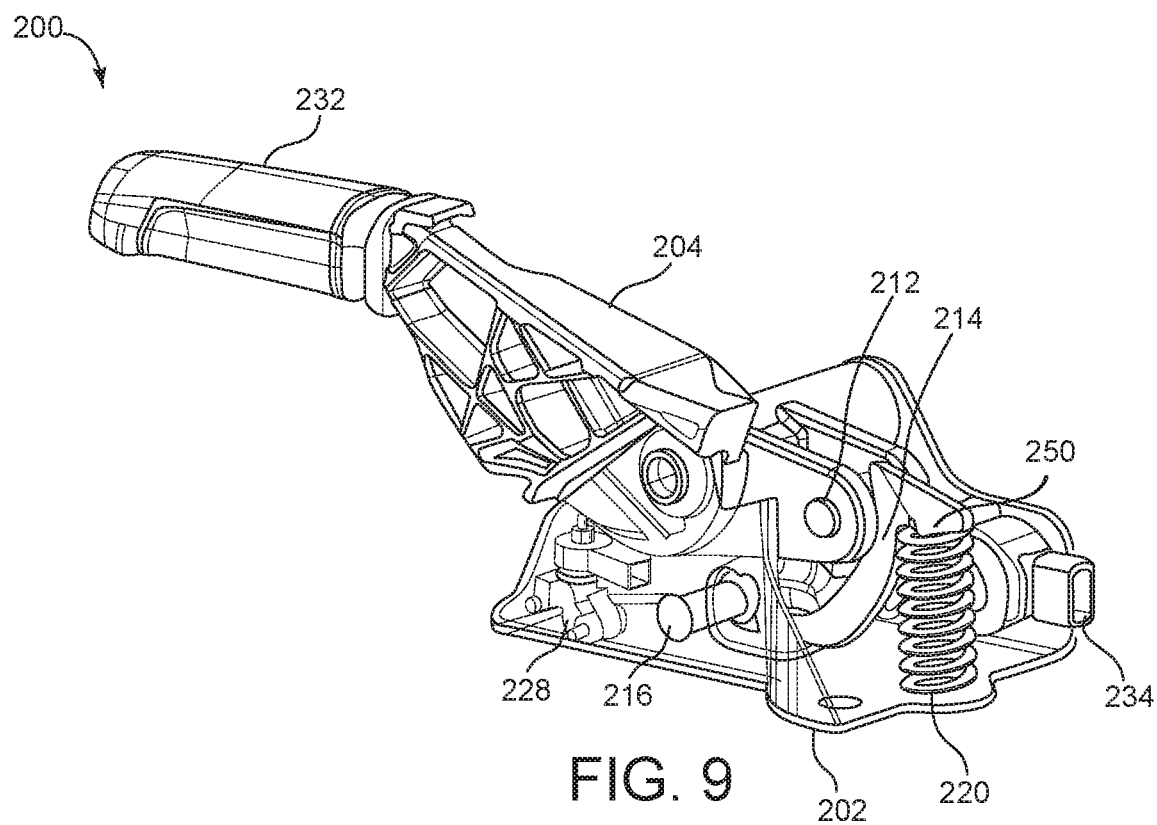
FIG. 9 is another perspective view of the parking brake emulator assembly shown in FIG. 7 in a neutral position.
Figure 10:
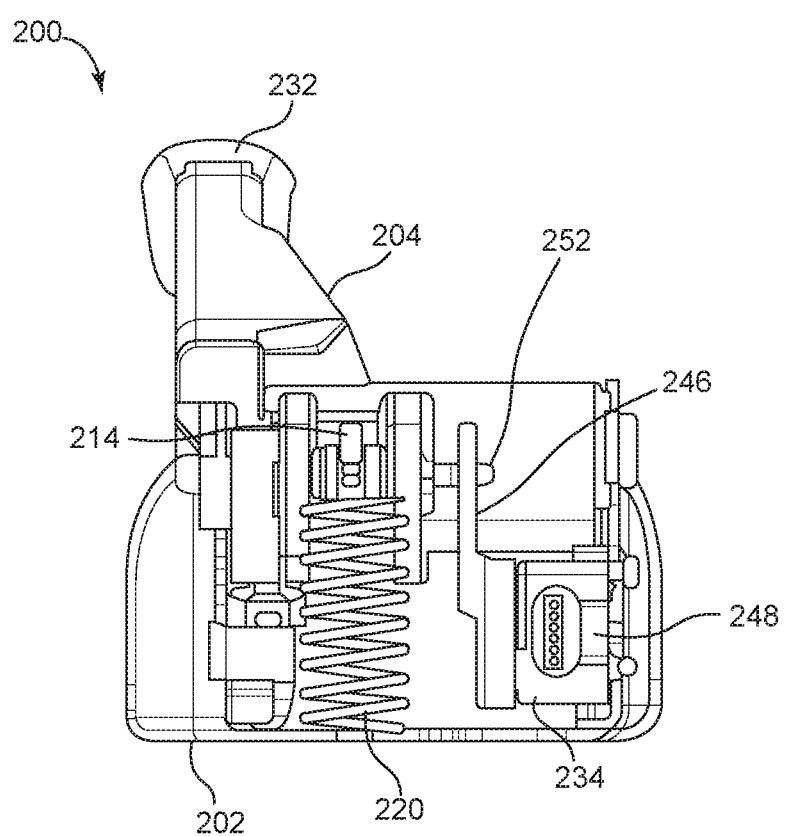
FIG. 10 is a rear elevation view of the parking brake emulator assembly shown in FIG. 7 in the neutral position.
Figure 11:
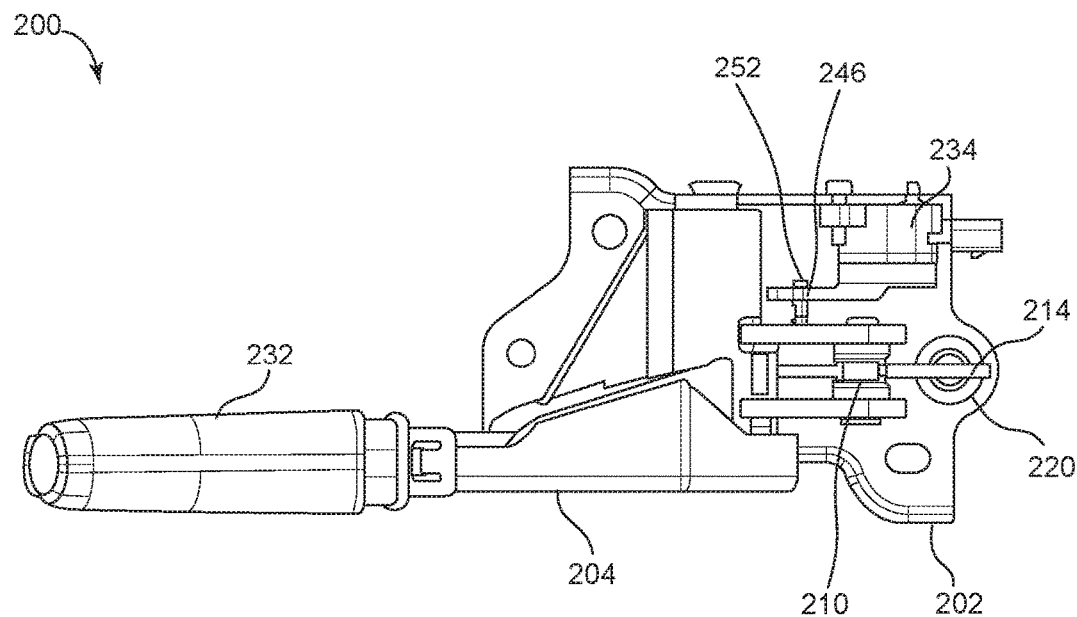
FIG. 11 is a top elevation view of the parking brake emulator assembly shown in FIG. 7 in the neutral position.
Figure 12:
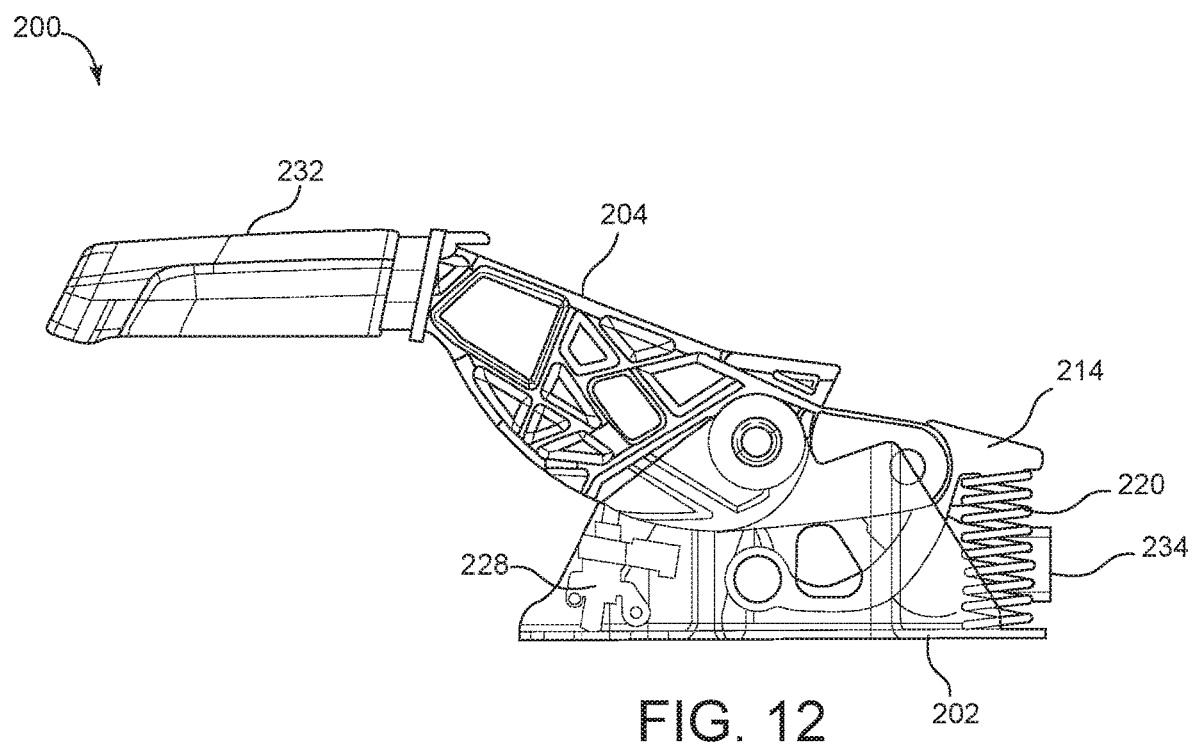
FIG. 12 is a side elevation view of the parking brake emulator assembly shown in FIG. 7 in the neutral position.
Figure 13:
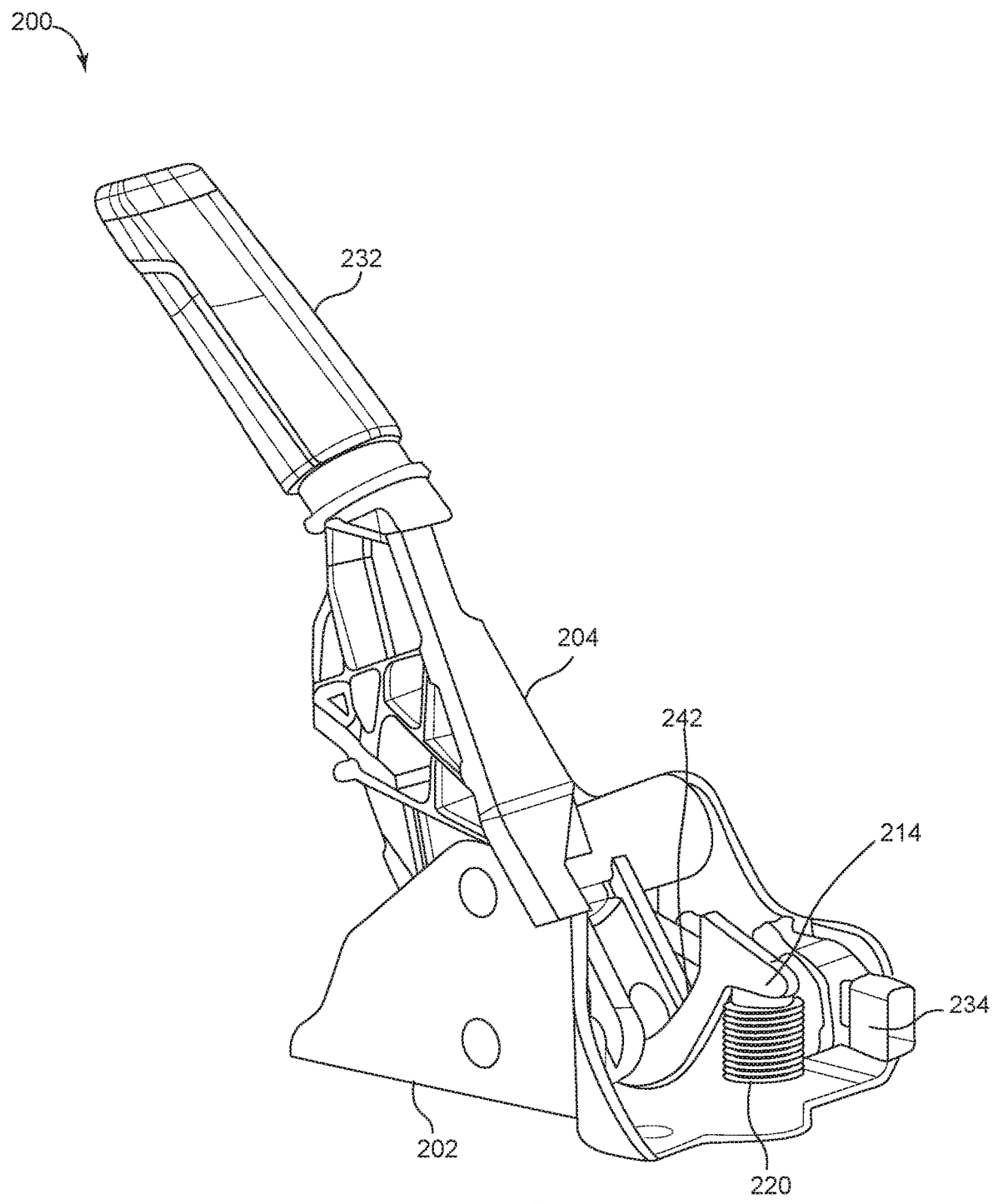
FIG. 13 is a perspective view of the parking brake emulator assembly shown in FIG. 7 in a full brake application position.

Turning now to FIGS. 7-13, various views of a cam and roller parking brake emulator assembly 200 are shown, according to an exemplary embodiment. FIG. 7 depicts a perspective view of the emulator assembly 200 in an assembled state, while FIG. 8 depicts an exploded perspective view of the emulator assembly 200. FIGS. 9-12 respectively depict perspective, rear, top, and side views of the emulator assembly 200 in a neutral position. FIG. 13 depicts a perspective view of the emulator assembly 200 in a brake application position.

Similar to emulator assembly 100, emulator assembly 200 is shown to include a mounting bracket 202 and a brake lever 204. In some views, (e.g., FIG. 9, FIG. 12) the mounting bracket 202 is depicted as transparent in order to better view the components mounted within the mounting bracket 202. The mounting bracket 202 is configured to couple the emulator assembly 200 to an appropriate location in the vehicle structure, while the brake lever 204 is rotatable by the driver of the vehicle into a neutral position, a brake application position, and a brake release position by applying upward or downward forces to a grip 232 of the brake lever 204. The brake lever 204 is rotatably coupled to the mounting bracket 202 through a pivot tube 206. The brake lever 204 rotates about the pivot tube 206 relative to the mounting bracket 202 through the use of one or more pivot bushings 208 installed into a pivot hole 236 of the brake lever 204.

The parking brake emulator assembly 200 is further shown to include spring and cam components configured to mimic the force provided by a brake cable when a mechanical parking brake is applied by a driver. These components include cam lever 214, a compression spring 220, and a compression spring guide 222. As shown in FIG. 8, the cam lever 214 includes a first end with a cam hole 230 and a second end with a lever arm 250. The lever arm 250 of the cam lever 214 is coupled to the compression spring 220 to apply a compression force to the spring 220. The compression spring 220 may be chosen such that its characteristic spring rate (e.g., expressed in lbf/in or N/m) approximates the force that would be provided by a mechanical brake system. Additional similarities of emulator assembly 200 to the emulator assembly 100, described above with reference to FIGS. 1-6, include the presence of a toggle switch assembly 228 and an angular sensor assembly 234. In some embodiments, toggle switch assembly 228 and angular sensor assembly 234 are identical or substantially similar to toggle switch assembly 132 and angular sensor assembly 126.

Referring specifically to FIG. 8, an assembly process for the emulator assembly 200 may proceed as follows. First, the compression spring guide 222 is secured to the mounting bracket 202, and a cam bushing 218 is flared into a cam hole 230 of the cam lever 214 using a press. Next, the cam lever 214 is aligned with a cam lever hole 238 of the mounting bracket 202, and a cam shoulder pin 216 is inserted through the cam lever hole 238 and the cam hole 230 to rotatably couple the cam lever 214 to the mounting bracket 202. In some embodiments, the cam shoulder pin 216 is secured into position using any suitable process, such as a riveting process.

Next, a roller 210 is aligned between two spaced apart roller holes 240 of the brake lever 204, and a roller pin 212 is inserted through a first roller hole 240, the roller 210, and a second roller hole 240 to couple the roller 210 to the brake lever 204. In some embodiments, roller pin 212 is then secured to the brake lever 204 using any suitable process, such as a riveting process. The roller 210 is configured to travel along the cam surface 242 of the cam lever 214 as the cam lever 214 is rotated into a neutral position, a brake application position, and a brake disengage position. Further details of this action are provided below with reference to FIG. 13. In one or more embodiments, the cam surface 242 can include features (e.g., protrusions, recesses) which effect an increase or a decrease in the force applied by the roller 210 as it travels along the cam surface 242.

The next step in the assembly process of emulator assembly 200 includes inserting pivot bushings 208 into both sides of the pivot hole 236 of the brake lever 204. The pivot bushings 208 are then aligned with pivot holes 244 of the mounting bracket 202, and the pivot tube 206 is inserted through a first pivot hole 244, a first pivot bushing 208, a second pivot bushing 208, and a second pivot hole 244. Once installed, the pivot tube 206 can be staked at each end to create an interference fit between the pivot tube 206 and the pivot holes 244 of the mounting bracket 202.

To install the angular sensor assembly 234, the forked portion 246 is first aligned with a protrusion 252 (depicted in FIGS. 10 and 11) on the brake lever 204 so that the forked portion 246 rotates with the brake lever 204. The angular sensor assembly 234 and the toggle switch assembly 228 are then coupled to the mounting bracket 202 through any suitable mechanical element or fastener (e.g., bolts, screws, pins, rivets, etc.). Next, the compression spring 220 is installed using a small press or hand tool to secure the compression spring 220 between the cam lever 214 and the compression spring guide 222. The assembly process concludes by inserting the grip 232 onto the lever arm end 248 of the brake lever 204.

When the parking brake assembly 200 is in the neutral position, as depicted in FIGS. 9-12, the compression spring 220 is in a partially compressed state to prevent noise, such as due to rattling of the compression spring 220 during normal vehicle operation. As depicted in FIG. 13, when a vehicle operator applies an upward force on the grip 232, the roller 210 rotates on the cam surface 242 of the cam lever 214. This action causes the cam lever 214 to rotate and thereby compress the compression spring 220 to provide the force that emulates the force experienced in a mechanical parking brake system. As the brake lever 204 is rotated from the neutral position to the brake application position, the forked portion 246 of the angular sensor assembly 234 is rotated along with the brake lever 204, which causes the angular sensor assembly 234 to transmit a signal to the electronic parking brake module to engage the parking brake mechanism. In one or more embodiments, the angular sensor assembly 234 can detect the angular rotation of the forked portion 246 relative to the body portion 248 and transmit a signal to the electronic parking brake module to apply to a variable parking brake force based on the angular rotation of the forked portion 246. The toggle switch assembly 228, if provided, is configured to detect the change in brake lever 204 position and upon detection, sends a control signal to the vehicle computer to illuminate a parking brake indicator on the vehicle instrument panel.

Once the driver releases the upward force on the grip 232, the brake lever 204 automatically travels from the brake application position to the neutral position as the compression of the spring 220 relaxes. When a vehicle operator applies a downward force on the grip 232 to rotate the brake lever 204 from the neutral position to the brake disengage position (e.g., approximately 5° from the neutral position), the cam surface 242 of the cam lever 214 rotates around the roller 210 on the brake lever 204 to compress the spring 220. As the brake lever 204 rotates from the neutral position to the brake disengage position, the movement of the forked portion 246 relative to the body portion 248 causes angular sensor assembly 234 to transmit a signal to the electronic parking brake module to disengage the parking brake mechanism, while the toggle switch assembly 228 sends a control signal to the vehicle computer to turn off the parking brake indicator on the vehicle instrument panel. After the driver releases the downward force on the grip 232, relaxation of the spring 220 causes the brake lever 204 to automatically return to the neutral position.

Figure 14:
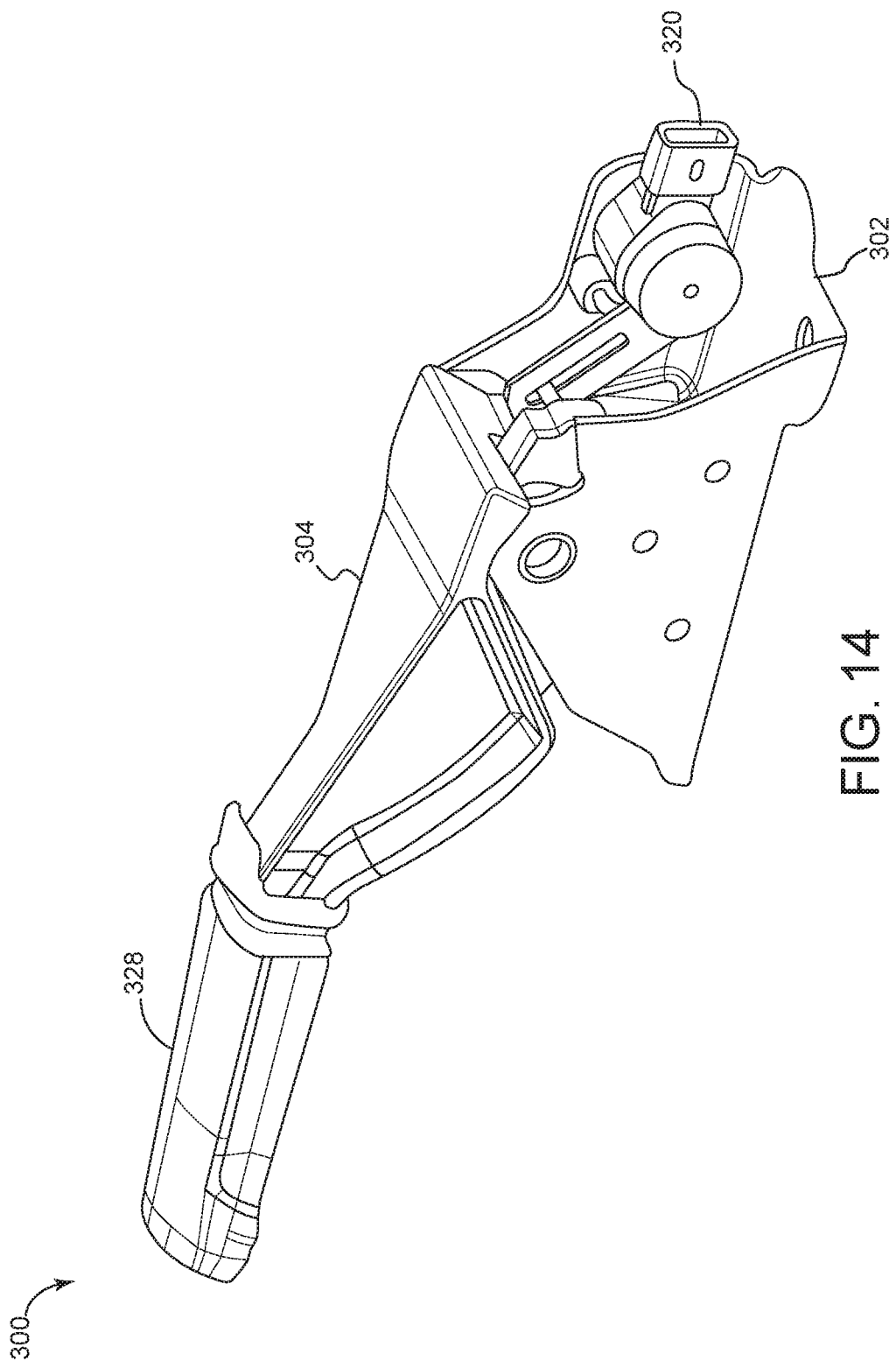
FIG. 14 is a perspective view of an exemplary embodiment of an integrated cam lever and roller parking brake emulator assembly, according to this application.
Figure 15:
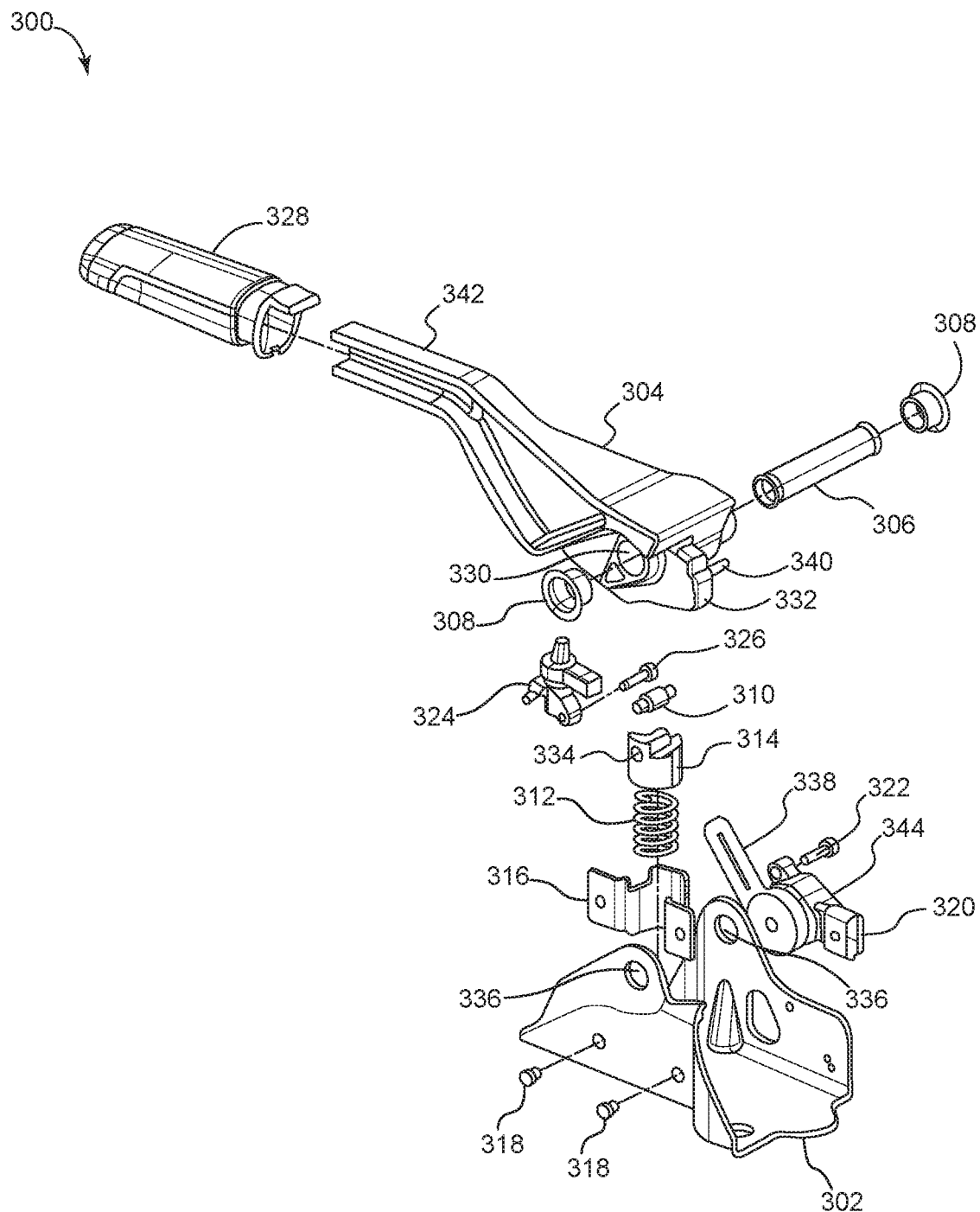
FIG. 15 is an exploded perspective view of the parking brake emulator assembly shown in FIG. 14.
Figure 16:
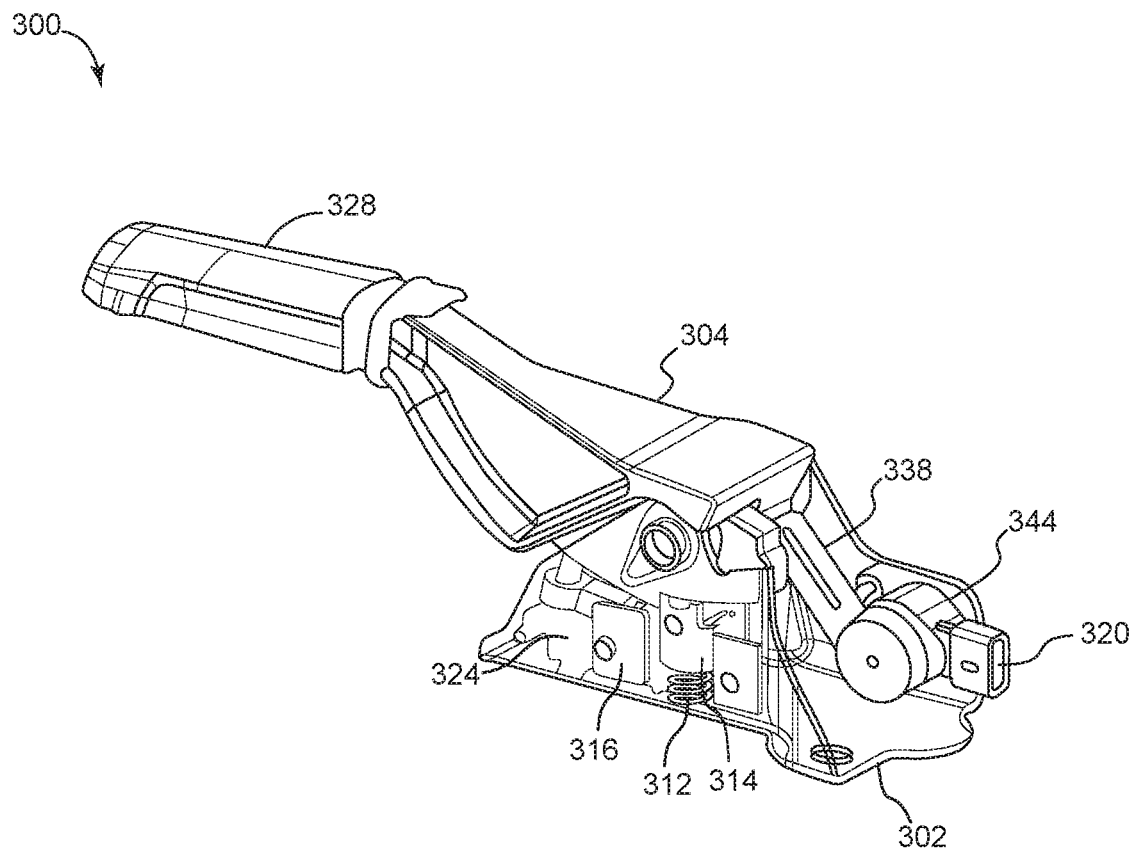
FIG. 16 is another perspective view of the parking brake emulator assembly shown in FIG. 14 in a neutral position.
Figure 17:
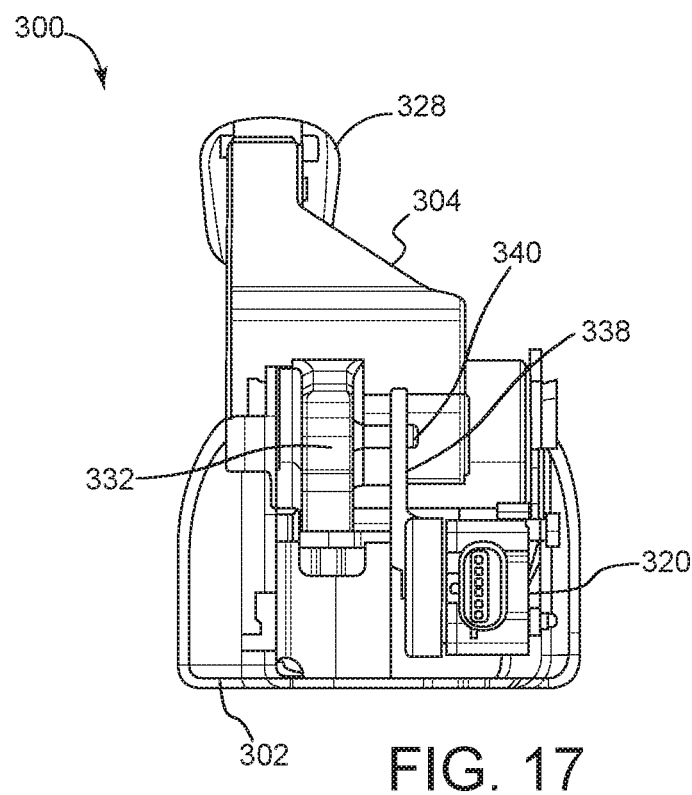
FIG. 17 is a rear elevation view of the parking brake emulator assembly shown in FIG. 14 in the neutral position.
Figure 18:
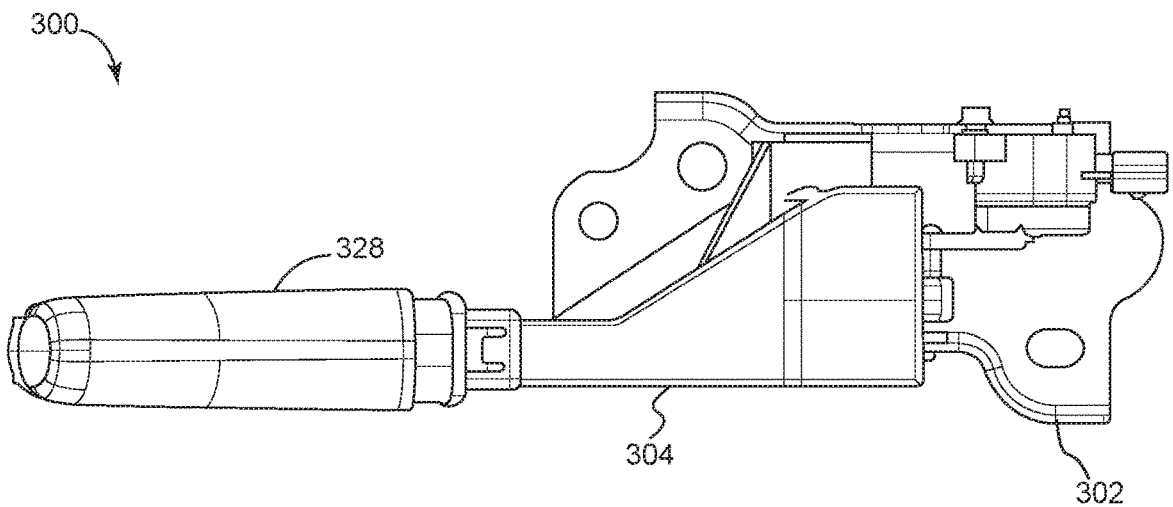
FIG. 18 is a top elevation view of the parking brake emulator assembly shown in FIG. 14 in the neutral position.
Figure 19:
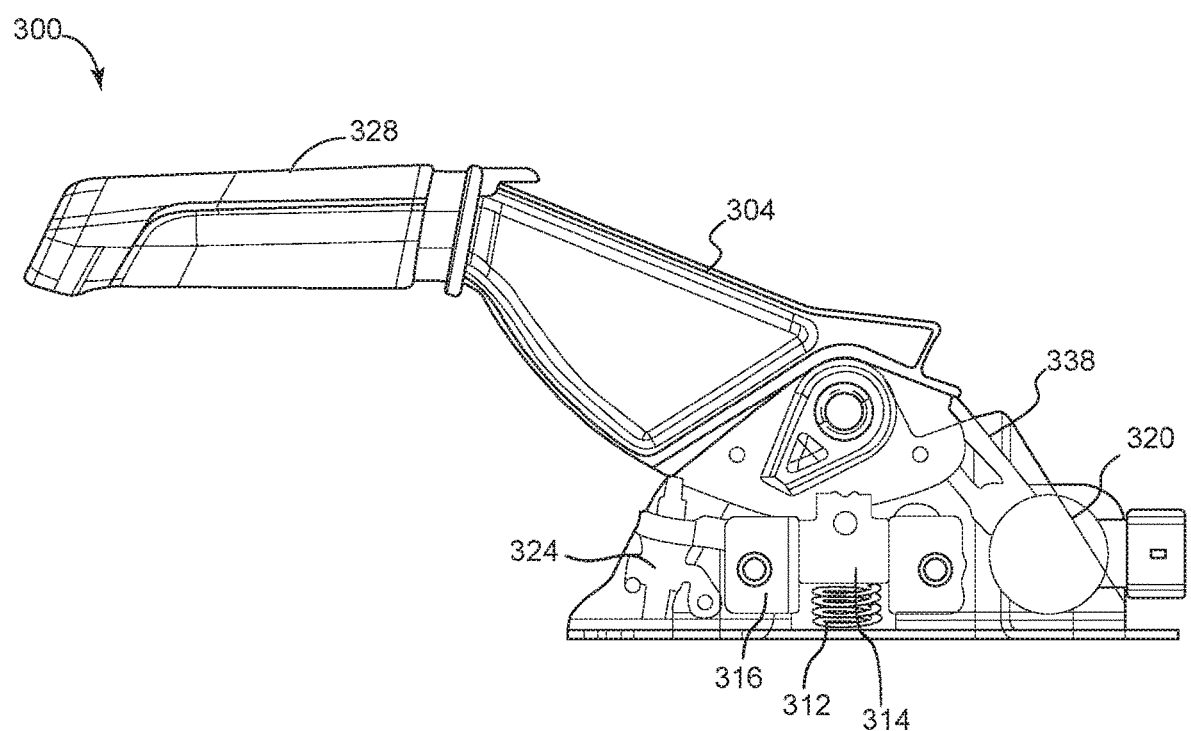
FIG. 19 is a side elevation view of the parking brake emulator assembly shown in FIG. 14 in the neutral position.
Figure 20:
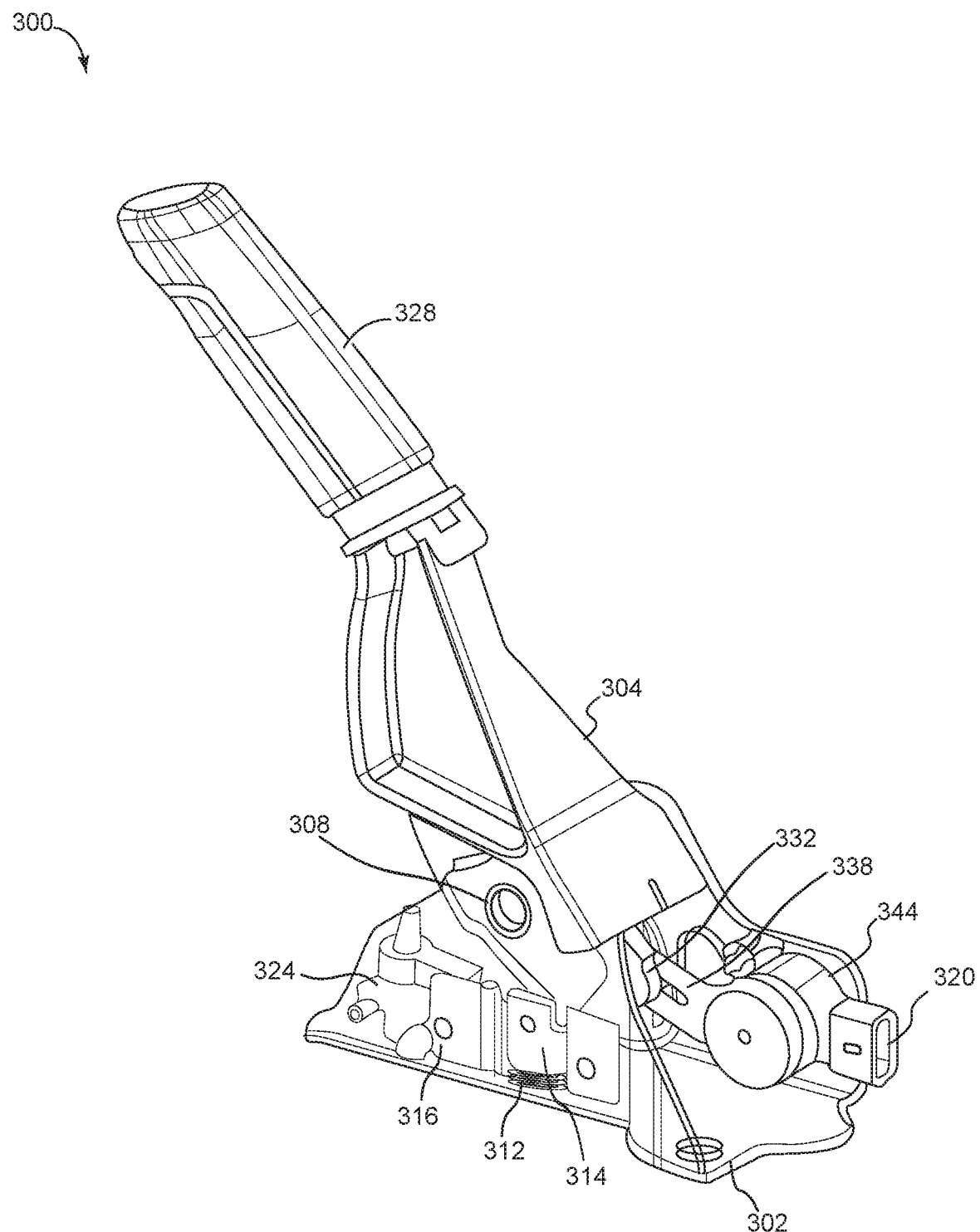
FIG. 20 is perspective view of the parking brake emulator assembly shown in FIG. 14 in a full brake application position.

Referring now to FIGS. 14-20, various views of an integrated cam lever and roller parking brake emulator assembly 300 are shown, according to an exemplary embodiment. FIG. 14 depicts a perspective view of the emulator assembly 300 in an assembled state, while FIG. 15 depicts an exploded perspective view of the emulator assembly 300. FIGS. 16-19 respectively depict perspective, rear, top, and side views of the emulator assembly 300 in a neutral position. FIG. 20 depicts a perspective view of the emulator assembly 300 in a brake application position.

Similar to the emulator assemblies 100 and 200, the emulator assembly 300 is shown to include a mounting bracket 302 and a brake lever 304. In some views, (e.g., FIGS. 16, 19 and 20) mounting bracket 302 is depicted as transparent in order to better view the components mounted within mounting bracket 302. The mounting bracket 302 couples the emulator assembly 300 to part of the vehicle structure, and the brake lever 304 is rotatable relative to the mounting bracket 302 into a neutral position, a brake application position, and a brake disengage position by applying upward or downward forces to a grip 328 of the brake lever 304. The brake lever 304 is rotatably coupled to mounting bracket 302 through a pivot tube 306. The pivot tube 306 is configured to permit brake lever 304 to rotate relative to the mounting bracket 302 through the use of one or more pivot bushings 308 installed into a pivot hole 330 of the brake lever 304.

The parking brake emulator assembly 300 is further shown to include spring and cam components, which are configured to mimic the force provided by a mechanical parking brake that operates a brake cable. These components include a steel roller 310, a compression spring 312, a spring retainer 314, and an integrated cam surface 332 of the brake lever 304. Similar to the compression springs of the emulator assemblies 100 and 200 described above, the compression spring 312 may be chosen such that its characteristic spring rate (e.g., expressed in lbf/in or N/m) approximates that force that would be provided by a mechanical brake system. Additional similarities of the emulator assembly 300 to the emulator assemblies 100 and 200, include the presence of a toggle switch assembly 324 and an angular sensor assembly 320.

Referring specifically to FIG. 15, an exemplary assembly process for the emulator assembly 300 may proceed as follows. First, a spring housing bracket 316 is secured to the mounting bracket 302 with fasteners (e.g., rivets 318). The compression spring 312 is inserted into the spring housing bracket 316, and the spring retainer 314 is installed on top of the compression spring 312. The roller 310 is then aligned with a roller hole 334 of the spring retainer 314 and locked into position at the top of spring retainer 314.

The next step in the assembly process of the emulator assembly 300 includes inserting pivot bushings 308 into both sides of the pivot hole 330 of the brake lever 304. The pivot bushings 308 are then aligned with pivot holes 336 of the mounting bracket 302, and the pivot tube 306 can be inserted through a first pivot hole 336, a first pivot bushing 308, a second pivot bushing 308, and a second pivot hole 336. Once installed, the pivot tube 306 can be staked at each end to create an interference fit between the pivot tube 306 and the pivot holes 336 of the mounting bracket 302.

To install the angular sensor assembly 320, the slotted portion 338 is first aligned with a protrusion 340 on the brake lever 304 such that the slotted portion 338 rotates with the brake lever 304 relative to the body portion 344. The angular sensor assembly 320 and the toggle switch assembly 324 are then coupled to the mounting bracket 302 through any suitable mechanical element or fastener (e.g., bolts, screws, pins, rivets, etc.). In some embodiments, the angular sensor assembly 320 is coupled to the mounting bracket 302 through a screw 322, while the toggle switch assembly 324 is coupled to mounting bracket 302 through a screw 326. The assembly process concludes by inserting the grip 328 onto the lever arm end 342 of the brake lever 304. Although an exemplary assembly process has been described for each embodiment, it is noted that the steps in each assembly process can be varied as described. For example, the sequence of assembly can be varied from what has been described.

When the parking brake assembly 300 is in the neutral position, as depicted in FIGS. 16-19, the compression spring 312 is in a partially compressed state to prevent excessive noise, such as due to rattling under normal vehicle operation. The amount of preload applied by the compression spring 312 may vary based on the characteristics of the compression spring 312. For example, in some embodiments, the preload compresses spring 312 two or three millimeters. As depicted in FIG. 20, when a vehicle operator applies an upward force on the grip 328, the roller 310 rotates on the integrated cam surface 332 of the brake lever 304. This causes the spring retainer 314 to compress the spring 312 to provide the force that emulates the force experienced in a mechanical parking brake system. As the brake lever 304 is rotated from the neutral position to the brake application position, the slotted portion 338 of the angular sensor assembly 320 is rotated along with the brake lever 304, which causes the angular sensor assembly 320 to transmit a signal to the electronic parking brake module to engage the parking brake mechanism. In one or more embodiments, the angular sensor assembly 320 can detect and measure the angular rotation of the slotted portion 338 relative to the body portion 344 and transmit a signal to the electronic parking brake module to apply to a variable parking brake force based on the angular rotation of the slotted portion 338. The toggle switch assembly 324 can also be configured to detect the change in brake lever 304 position and may send a control signal to the vehicle computer to illuminate a parking brake indicator on the vehicle instrument panel.

Once the driver releases the upward force on grip 328, the brake lever automatically travels from the brake application position to the neutral position as the compression of the spring 312 relaxes. When a vehicle operator applies a downward force on the grip 328 to rotate the brake lever 304 from the neutral position to the brake disengage position (e.g., approximately 5° from the neutral position), the integrated cam surface 332 of the brake lever 304 rotates around the roller 310 to compress the compression spring 312. At the same time, the movement of the slotted portion 338 relative to the body portion 344 causes angular sensor assembly 320 to transmit a signal to the electronic parking brake module to disengage the parking brake mechanism, while the toggle switch assembly 324 can send a control signal to the vehicle computer to turn off the parking brake indicator on the vehicle instrument panel. After the driver releases the downward force on the grip 328, relaxation of the spring 312 causes the brake lever to automatically return to the neutral position.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the parking brake emulator assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., a mounting bracket, a brake lever, a spring, a spring holder, a cam member, a roller) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A parking brake emulator assembly for a vehicle, comprising:
   a mounting bracket comprising a front spring mounting flange with a spring mounting hole;
   a brake lever rotatable relative to the mounting bracket into a neutral position and a brake application position;
   a spring guiding rod having a first end coupled to the brake lever through a pinned connection;
   a spring aligned with the spring mounting hole; and
   a rear spring holder aligned with the spring mounting hole;
   wherein the spring guiding rod extends through the spring and the rear spring holder, and a second end of the spring guiding rod is coupled to the rear spring holder;
   wherein rotation of the brake lever from the neutral position to the brake application position moves the pinned connection to thereby move the spring guiding rod and the rear spring holder toward the front spring mounting flange, thereby compressing the spring.

2. The parking brake emulator assembly of claim 1, further comprising an angular sensor having a body portion coupled to the mounting bracket and a forked portion that is rotatable relative to the body portion, wherein the forked portion is operatively coupled to the brake lever so that the angular sensor is configured to:
   detect that the brake lever is in the brake application position; and
   transmit a control signal to an electronic parking brake module to engage a vehicle parking brake system in response to detecting the brake lever in the brake application position.

3. The parking brake emulator assembly of claim 2, wherein the brake lever is rotatable relative to the mounting bracket into a brake disengage position, wherein the neutral position is located between the brake application position and the brake disengage position, and wherein the angular sensor is further configured to:
   detect that the brake lever is in the brake disengage position; and
   transmit a control signal to the electronic parking brake module to disengage the vehicle parking brake system in response to detecting the brake lever in the brake disengage position.

4. The parking brake emulator assembly of claim 2, wherein the forked portion is slideably coupled to a brake lever protrusion.

5. The parking brake emulator assembly of claim 4, wherein rotation of the brake lever rotates the forked portion relative to the body portion through the brake lever protrusion.

6. The parking brake emulator assembly of claim 1, further comprising a toggle switch coupled to the mounting bracket and configured to:
   detect that the brake lever is in the brake application position; and
   transmit a brake indicator illumination signal to a vehicle computer system in response to detecting the brake lever is in the brake application position.

7. The parking brake emulator assembly of claim 1, wherein the mounting bracket further comprises a rear spring mounting flange with a spring mounting hole, and the rear spring holder is slideably disposed in the spring mounting hole in the rear spring mounting flange.

8. The parking brake emulator assembly of claim 1, further comprising:
   a second spring guiding rod spaced apart from the spring guiding rod and having a first end coupled to the brake lever though the pinned connection;
   a second spring; and
   a second rear spring holder;
   wherein the second spring guiding rod extends through the second spring and the second rear spring holder, and a second end of the second spring guiding rod is coupled to the second rear spring holder; and
   wherein rotation of the brake lever from the neutral position to the brake application position moves the pinned connection to thereby move the second spring guiding rod and the second rear spring holder toward the front spring mounting flange, thereby compressing the second spring.

9. A parking brake emulator assembly for a vehicle, comprising:
a mounting bracket;
a brake lever configured to be rotated relative to the mounting bracket into a neutral position and a brake application position, the brake lever comprising:
 a first end configured to receive an applied force for the purpose of rotating the brake lever between the neutral position and the brake application position; and
 a second end comprising a roller component;
a cam member comprising:
 a first end pivotally coupled to the mounting bracket;
 a second end comprising a lever arm; and
 a cam surface located between the first and second ends, wherein the cam surface is configured to contact the roller component; and
a spring having a first end, which is coupled to the mounting bracket, and a second end, which is coupled to the lever arm;
wherein rotation of the brake lever from the neutral position to the brake application position in turn pivots the cam member as the roller component moves along the cam surface to compress the spring with the lever arm.

10. The parking brake emulator assembly of claim 9, further comprising an angular sensor having a body portion coupled to the mounting bracket and a forked portion that is rotatable relative to the body portion, wherein the forked portion is operatively coupled to the brake lever so that the angular sensor is configured to:
detect that the brake lever is in the brake application position; and
transmit a control signal to an electronic parking brake module to engage a vehicle parking brake system.

11. The parking brake emulator assembly of claim 10, wherein the brake lever is rotatable relative to the mounting bracket into a brake disengage position, wherein the neutral position is located between the brake application position and the brake disengage position, and wherein the angular sensor is further configured to:
detect that the brake lever is in the brake disengage position; and
transmit a control signal to the electronic parking brake module to disengage the vehicle parking brake system in response to detecting the brake lever in the brake disengage position.

12. The parking brake emulator assembly of claim 10, wherein the forked portion is slideably coupled to a brake lever protrusion.

13. The parking brake emulator assembly of claim 12, wherein rotation of the brake lever rotates the forked portion relative to the body portion through the brake lever protrusion.

14. The parking brake emulator assembly of claim 9, further comprising a toggle switch coupled to the mounting bracket and configured to:
detect that the brake lever is in the brake application position; and
transmit a brake indicator illumination signal to a vehicle computer system in response to detecting the brake lever is in the brake application position.

15. A parking brake emulator assembly for a vehicle, comprising:
a mounting bracket;
a brake lever rotatably coupled to the mounting bracket at a pivot, the brake lever comprising a lever arm and an integrated cam surface on opposite sides of the pivot, wherein the brake lever is rotatable through the lever arm into a neutral position and a brake application position;
a spring comprising a first end and a second end, the first end coupled to the mounting bracket and the second end coupled to a spring retainer; and
a roller operatively coupled to the spring retainer and in contact with the integrated cam surface;
wherein the roller moves along the cam surface in response to rotation of the brake lever from the neutral position to the brake application position, which in turn moves the roller and the spring retainer to compress the spring.

16. The parking brake emulator assembly of claim 15, further comprising an angular sensor having a body portion coupled to the mounting bracket and a slotted portion that is rotatable relative to the body portion, wherein the slotted portion is operatively coupled to the brake lever so that the angular sensor is configured to:
detect that the brake lever is in the brake application position; and
transmit a control signal to an electronic parking brake module to engage a vehicle parking brake system.

17. The parking brake emulator assembly of claim 16, wherein the brake lever is rotatable relative to the mounting bracket into a brake disengage position, wherein the neutral position is located between the brake application position and the brake disengage position, and wherein the angular sensor is further configured to:
detect that the brake lever is in the brake disengage position; and
transmit a control signal to the electronic parking brake module to disengage the vehicle parking brake system.

18. The parking brake emulator assembly of claim 16, wherein the slotted portion is slideably coupled to a brake lever protrusion.

19. The parking brake emulator assembly of claim 18, wherein rotation of the brake lever rotates the slotted portion relative to the body portion through the brake lever protrusion.

20. The parking brake emulator assembly of claim 18, wherein the angular sensor:
detects the angular position of the slotted portion relative to the body portion; and
transmits a control signal to an electronic parking brake module to apply a parking brake force, wherein an amount of the parking brake force is based on the angular position of the slotted portion.

* * * * *